W. AUSTIN.
CONVEYER CHAIN.
APPLICATION FILED JUNE 18, 1915.
1,189,036.
Patented June 27, 1916.
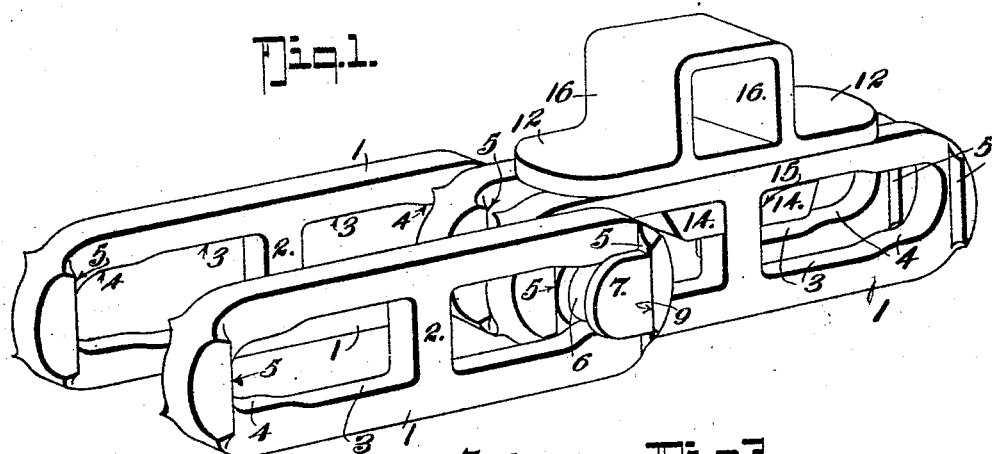
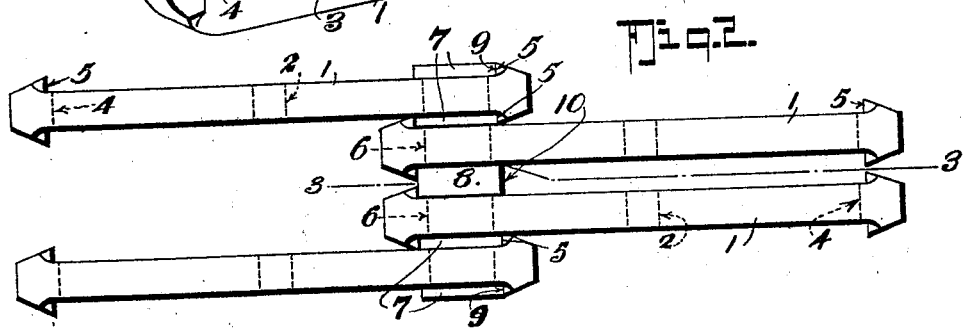
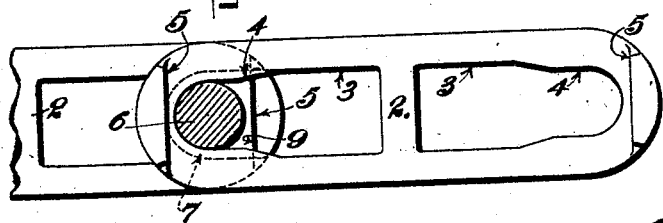
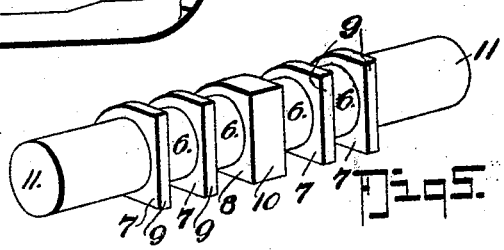
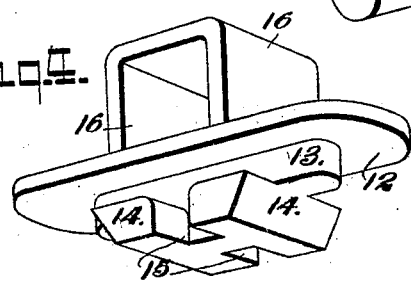
INVENTOR
William Austin.
BY
Fred G. Dieterich
ATTORNEYS

UNITED STATES PATENT OFFICE.

WILLIAM AUSTIN, OF PITTSTON, PENNSYLVANIA, ASSIGNOR TO MICHAEL W. O'BOYLE, OF PITTSTON, PENNSYLVANIA.

CONVEYER-CHAIN.

1,189,036. Specification of Letters Patent. Patented June 27, 1916.

Application filed June 18, 1915. Serial No. 34,909.

*To all whom it may concern:*

Be it known that I, WILLIAM AUSTIN, residing at Pittston, in the county of Luzerne and State of Pennsylvania, have invented certain new and useful Improvements in Conveyer-Chains, of which the following is a specification.

My invention is an improved chain especially designed and adapted for use as a driving chain in conveyers and the like, and the invention primarily has for its object to provide a chain composed of links and pins so correlated that the use of rivets or bolts is made unnecessary and the chain links and pins can be readily assembled or separated without the use of tools.

Another object of the invention is to provide a chain in which the links and pins are so correlated that the wear may be made to occur on either set of links, (the outer set or the inner set) and when one set is worn down the pins may be adjusted to place the wear on the other set of links, thus doubling the life of the chain.

The invention also includes those novel details of construction, combination and arrangement of parts, all of which will be first fully described, then be specifically pointed out in the appended claims, and illustrated in the accompanying drawing, in which:—

Figure 1 is a perspective view of a portion of a conveyer chain illustrating the invention. Fig. 2 is a top plan view of the part shown in Fig. 1. Fig. 3 is a detail section on the line 3—3 of Fig. 2. Fig. 4 is a perspective view of the chain fixture to which the conveyed members (not shown) are attached. Fig. 5 is a perspective view of a modified form of chain pin for use on chains for an outside drive.

In the drawing, in which like numerals of reference designate like parts in all of the figures, 1 represents the links all of which are of the same construction and include a central brace portion 2 and longitudinal openings 3 at each side thereof, the openings 3 terminating in the reduced ends 4 which are of semi-circular form to form bearing surfaces for the bearing portions 6 of the pivot pins. Each link is also provided at each end and on each side with shoulders 5 against which the flat faces 9 of the separating plates or collars 7 of the pivot pins are designed to engage to hold the pivot pins in non-rotative relation to either of the outer or the inner links of a group, according to the position of adjustment of the pivot pin. Each pivot pin consists of a central spacing plate or collar 8, intermediate spacing plates or collars 7 and a pair of outer spacing plates or collars 7, the plates 7 and 8 being of disk-like form except at one side where they are cut straight as at 9 and 10 respectively. The purpose of providing the flat faces 9 and 10 is to enable the pin to engage the shoulders 5 of either the outer or inner pair of links, according to the position of adjustment of the pin and thus provide an immovable engagement between the plates 7 and 8 and the said pair of links. This is shown in Figs. 1, 2 and 3, by reference to which it will be observed that in the attachment there shown the pins have the outer and intermediate plates 7 in engagement with the shoulder portions 5 of the outer links 1 and the rounded sides of the intermediate and central plates 7 and 8 in engagement with the shoulders 5 of the inner links 1. Thus, the pivot pins have no movement relative to the outer links but form the fulcrums or pivots around which the inner links have movement.

In practice, assume that the square sides of the pin plates or collars 7 are against the lugs on the outside links, the pins in this position have movement as an integral part of the outside links and consequently cause no wear whatever on these links, the wear being then entirely on the inside links which have an oscillating movement on the pins. After the chain has been in use a sufficient length of time, with the pins in this position, to cause the inside links to be worn out of pitch say one-fourth of an inch of lost motion, by simply turning the pins around through a half circle the worn links will then be engaged by the squared sides of the pin heads and collars and the pins will have become, as it were, an integral part of the inner links and the oscillation or wearing movement will take place at the outer links which have turned on the pins as pivots, the chain being restored to its original pitch and the other set of unworn links will then be used as the pivoting links until the chain is worn out.

It will also be observed that the collars or plates 7 and 8 serve as spacers to prevent the links from chafing together. When the chain is to be used with an outside drive the pins are provided with extensions 11 which serve as bearings.

The chain is also preferably provided with a fixture by means of which the chain carried parts can be attached. This fixture consists essentially of a base plate 12 having a web 13 to fit between a pair of inner links and provided with lugs 14 that project into the openings 3 of the links and are themselves spaced apart as at 15 to straddle the portions 2 of the links. When the fixture is to be used to receive the bar of a twin line for a bag or package elevator, the base 12 is provided with an eye 16. Of course, it is obvious that in lieu of the eye 16 other members may be provided to suit the particular case met with in practice, as, for example, a hook for a car haul, a flight for a scraper line, a pad for a bucket, etc., may be employed in lieu of the eye 16 and as the detailed formation of the portion 16 of the fixture forms no part, *per se*, of the present invention, illustration of these modifications is not thought to be necessary.

It is also to be noted that the slots 3 are designed to provide for the insertion of the pins, while the reduced portions 4 receive the bearing portions 6 of the pins, thus the parts can be assembled readily without the use of any tools and no separate means are necessary to hold the pins and the links in correlated position.

From the foregoing description taken in connection with the accompanying drawing, it is thought the complete construction, operation and advantages of my invention will be readily understood by those skilled in the art.

What I claim is:

1. A conveyer chain composed of sets of inner and outer links, and pivot pins passing through said links, said pivot pins having heads and collars of disk-like form and each provided with a corresponding flat surface, said links having slots through which said pins are adapted to be inserted into position, said links having shoulders adapted to be engaged by said flat surfaces of said heads and collars, said pins being reversible whereby said flat surfaces may engage the shoulders of the outer or the inner sets of links as desired.

2. A chain composed of links, each of said links comprising an elongated body having slots at its ends, the ends of the slots forming pin bearing surfaces, said slots being enlarged toward the middle of the link, and pins having heads and collars designed to pass through the enlarged portions of said slots, said pins having bearing surfaces designed to fit into the bearing ends of said slots, each of said links also including shoulders at its ends, said pin heads and collars having flat portions adapted to engage said shoulders whereby said pins may be immovably held with relation to the outer or inner set of links, according to the adjustment of the pins, all being arranged substantially as shown and described.

3. A conveyer chain composed of sets of inner and outer links, each of said links being of the same construction and having slots provided with rounded pin seats, said links having side shoulders at the ends adjacent to the pin seats, pivot pins passing through said links, said pivot pins having cylindrical bearing portions separated by collars, said cylindrical bearing portions being designed to engage the pin seats of said links, said collars having one-half their peripheral surface substantially circular and the remainder of each said peripheral surface provided with a flat surface or edge to engage the side shoulders of the links, the flat edges of the collars lying on the same side of the pin whereby the pins may be positioned so that the flat edges of the collars adjacent to one pair of links may engage the shoulders of the said pair of links while the rounded edges of certain pin collars may engage the shoulders of the other pair of links, said pins being reversible in said links, substantially as shown and for the purposes described.

WILLIAM AUSTIN.